United States Patent
Biermann

(10) Patent No.: US 8,764,937 B2
(45) Date of Patent: Jul. 1, 2014

(54) INSTALLATION AND METHOD FOR CONVERSION OF PAPER RESIDUE INTO A MINERAL PRODUCT

(71) Applicant: Voith Patent GmbH, Heidenheim (DE)

(72) Inventor: Joseph Jan Peter Biermann, JH Apeldoorn (NL)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 13/627,480

(22) Filed: Sep. 26, 2012

(65) Prior Publication Data

US 2013/0274097 A1   Oct. 17, 2013

Related U.S. Application Data

(63) Continuation of application No. PCT/NL2011/050197, filed on Mar. 22, 2011.

(30) Foreign Application Priority Data

Mar. 26, 2010   (NL) .................................... 2004463

(51) Int. Cl.
  *D21C 11/12*   (2006.01)
(52) U.S. Cl.
  USPC ......................................................... 162/31
(58) Field of Classification Search
  USPC ............... 162/31; 34/582, 654; 122/4 D, 446; 110/245, 299; 432/48
  See application file for complete search history.

(56) References Cited

U.S. PATENT DOCUMENTS

| 4,864,944 A * | 9/1989 | Engstrom et al. ............. 110/299 |
| 2009/0056603 A1 * | 3/2009 | Havlena et al. ............... 110/245 |
| 2009/0314226 A1 * | 12/2009 | Higgins ....................... 122/4 D |

FOREIGN PATENT DOCUMENTS

| GB | 1 474 711 A | 5/1977 |
| GB | 2 030 689 A | 4/1980 |
| JP | 58069314 A | 4/1983 |
| WO | 94/17008 A1 | 8/1994 |
| WO | 96/06057 A1 | 2/1996 |

OTHER PUBLICATIONS

International Search Report dated Jun. 7, 2011 for International Patent Application No. PCT/NL2011/050197 (3 pages).

* cited by examiner

*Primary Examiner* — Mark Halpern
(74) *Attorney, Agent, or Firm* — Taylor IP, P.C.

(57) ABSTRACT

A method and apparatus for conversion of paper residue into a mineral product uses a fluidized bed device with a distribution plate for securing an even distribution and supply of at least combustion air to the bed material and to the paper residue. An air box below the distribution plate supplies combustion air to the bed material and paper residue above the distribution plate. A heat exchanging section receives in separate parts ambient air and flue gases from the fluidized bed device for exchanging heat between flue gases and ambient air. The heat exchanging section is connected to the air box for supplying the heated ambient air to the air box for use as combustion air. A control system is employed for controlling the amount of bed material and the dimension of its particles and is arranged to monitor and maintain a process parameter within a predefined range.

4 Claims, 3 Drawing Sheets

INSTALLATION AND METHOD FOR CONVERSION OF PAPER RESIDUE INTO A MINERAL PRODUCT

CROSS REFERENCE TO RELATED APPLICATIONS

This is a continuation of PCT application No. PCT/NL2011/050197, entitled "INSTALLATION AND METHOD FOR CONVERSION OF PAPER RESIDUE INTO A MINERAL PRODUCT", filed Mar. 22, 2011, which is incorporated herein by reference.

BACKGROUND OF THE INVENTION

1. Field of the Invention

The present invention relates to a method and apparatus for conversion of paper residue into a mineral product.

2. Description of the Related Art

Such a method and apparatus are known from practice and are taught by International Publication WO96/06057. The term "paper residue" as used herein includes both paper sludge resulting from the industrial production of paper, and paper waste such as paper having on average fibers which are too short. The paper residue may also include deinking sludge. The mineral product obtained with this method and installation can be used, for instance as replacement for cement or as a sorbent for removal of metals from (hot) gas streams.

The known method employs a fluidized bed device that forms part of the installation, whereby below the fluidized bed device there is a distribution plate for securing an even distribution and supply of at least combustion air to the bed material and to the paper residue that is introduced into the fluidized bed device for conversion to the mineral product.

An air box is provided below the distribution plate for supplying the combustion air to the bed material and to the paper residue above the distribution plate. The air box may in certain situations, in addition to the combustion air, also supply cleansed recirculated flue gases.

Although it is not necessary, it may be preferable from a viewpoint of energy-efficiency that a heat exchanging section is employed which receives in a first part thereof (ambient) air—which may be supplemented with recirculated flue gases—, and in a second part separate from the first part flue gases from the fluidized bed device for exchanging heat between the flue gases and the (ambient) air for heating the latter. The heat exchanging section is then further connected to the air box for supplying the heated (ambient) air to the air box for use as combustion air.

When employing the method and installation for converting paper residue into the mineral product continuously, the problem occurs that the quantity of bed material and the dimensions of its particles vary, causing the duration of uninterrupted or undisturbed operation of the installation to be limited. It is a known problem in the prior art that the amount of bed material and the diameter of its particles increase to a level that measures have to be taken. At times it is possible to remove during operation of the installation the deteriorated bed material and replace it with bed material having the appropriate properties. At other times this is not possible, in which case it is required to interrupt operation of the installation in order to allow the bed material to be replaced for material having the required specifications.

The proper operation of the installation for conversion of paper residue requires that the bed material and the diameter of its particles are maintained at a specified level. This specified level may vary a little between installations. The optimum level that applies to a specific installation may therefore need to be determined on a moderate trial and error basis. Generally speaking, the parameters that are desirable for the bed material and the diameter of its particles that are capable to entertain desirable fluidization conditions in the fluidized bed at fluidization velocities of more than 0.5 meter per second, are that the particles are maintained at a diameter between 0.7 and 4 millimeters (mm), for example between 1.2 and 1.8 mm. The height of the fluidized bed should be maintained at a level so that the pressure difference between a location immediately above the distribution plate and the freeboard area will be in the range between 40-200 centimeters (cm) water column. The bed material is further maintained at a level of its spherical shape factor of approximately 0.8.

The just-mentioned spherical shape factor, or sphericity, has been introduced in the general literature on fluidized bed combustion to account for deviation from the ideal spherically shaped particle. It is customary to define the sphericity as the ratio of the surface area of a perfect sphere and the surface of the particle under consideration, whilst both particles have identical volumes:

$$\text{Sphericity} = As/Ap \text{ and } 0 < \text{sphericity} < 1,$$

wherein As indicates the surface area of a perfect sphere, and Ap indicates the surface area of the particle that is considered, and wherein both particles have identical volumes.

Application of basic mathematics regarding the surface area and the volume of an ideal sphere results in:

$$\text{Sphericity} = ((4*pi*(3/(4*pi))^{(2/3)})*Vp^{(2/3)})/Ap,$$

wherein Vp is the volume of the particle under consideration and Ap is the surface area of this particle.

It goes without saying that replacement of the bed material goes at the expense of production quantity, whereas maintaining the conversion process with the deteriorated bed material goes at the expense of production quality. Both have a financial impact.

The prior art, notably GB-A-1 474 711 and JP 58069314, disclose fluidized bed devices in which it is known to control the feed rate of combustion air.

What is needed in the art is a method and apparatus for maintaining the bed material as used in a fluidized bed within specification, so as to avoid the necessity of interrupting or disturbing the continuous process of converting paper residue into a mineral product and to keep both production rate and production quality as high as possible.

SUMMARY OF THE INVENTION

The present invention provides a method and apparatus with a control system, and configuration that overcomes the existing problems with the known state of the art. The present invention further provides an apparatus with a control system that satisfies the following limitations:

A1. The control system is arranged to control the temperature of the combustion air in the air box within a range of the process parameter that is selected at a predefined target value of the temperature plus and minus 25° Celsius, for example plus and minus 15° Celsius;

A2. The control system is further embodied such that the target value of the temperature of the combustion air in the air box expressed in centigrades is defined by the equation 'target=−500*calorific value+1400. The calorific value expressed in megajoules per kilogram (MJ/ kg) relates to the paper residue including any additional matter that is introduced into the fluidized bed device; and/or B1. The control system is arranged to control the amount of combustion air supplied to the air box at a predefined target value plus and minus 15% for each square meter area of the distribution plate;

B2. The control system is further embodied such that the target value of the amount of the combustion air $Q_{target}$ that is supplied to the air box for each square meter of the distribution plate is defined by the equation Qtarget=4.35*organic fraction, wherein the organic fraction relates to the percentage organic material forming part of the paper residue that is introduced into the fluidized bed device; and/or B3. The control system is further embodied such that the target value of the amount of combustion air supplied to the air box for each square meter area of the distribution plate is set at a level of 1.7 cubic meters per second (m³/s) for each square meter area of the distribution plate.

It is remarked that it is possible that other gases are included in the combustion air. These other gases may for instance be recirculated flue gases escaping from the fluidized bed, for example cleansed, and may also be reheated.

It is further remarked that when in this application reference is made to the term "calorific value", this may relate to different definitions. The inventors have found that with the present invention results are obtained when the calorific value relates to the overall energy release of the paper residue and any other additional matter that is introduced into the fluidized bed device, which takes into account the energy conversion of constituent materials of the paper residue (and other introduced matter), including mineral transitions during the combustion in the fluidized bed device.

The present invention is also embodied in a method for conversion of paper residue into a mineral product, using a fluidized bed device with an air box and a distribution plate connected to the air box for an evenly distributed supply of at least combustion air to the bed material of the fluidized bed above the distribution plate, and to paper residue introduced into the fluidized bed device. The amount of bed material and the size of the bed material particles above the distribution plate are controlled by maintaining a process parameter within a predefined range, which process parameter relates to the amount of combustion air. According to the present invention this method has the following limitations:

A1. The temperature of the combustion air in the air box is controlled, and the range of the process parameter is selected at a predefined target value of the temperature plus and minus 25° Celsius, for example plus and minus 15° Celsius;

A2. The target value of the temperature of the combustion air in the air box expressed in centigrades is defined by the equation 'target=−500*calorific value+1400, wherein the calorific value expressed in MJ/kg relates to the paper residue including any additional matter that is introduced into the fluidized bed device; and/or B1. The amount of combustion air supplied to the air box is controlled at a predefined target value for each square meter area of the distribution plate, and the range of this parameter is selected at the target value plus and minus 15%;

B2. The target value of the amount of the combustion air $Q_{target}$ that is supplied to the air box for each square meter of the distribution plate is defined by the equation $Q_{target}$=4.35*organic fraction, wherein the organic fraction relates to the percentage organic material forming part of the paper residue that is introduced into the fluidized bed device; and/or B3. The target value of the amount of combustion air supplied to the air box for each square meter area of the distribution plate is set at a level of 1.7 m³/s for each square meter area of the distribution plate.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the and such exemplification is not to be construed as limiting the scope of the invention in any manner.

DETAILED DESCRIPTION OF THE INVENTION

Figure 1:
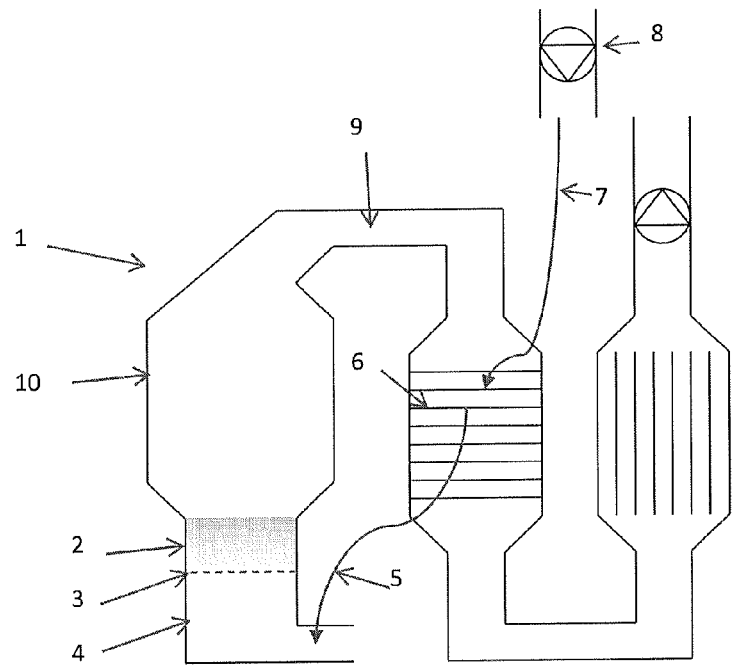
FIG. 1 is a schematic illustration of the apparatus for conversion of paper residue according to the present invention.

Referring now to the drawings, and more particularly to FIG. 1, there is shown reference 1 which refers to an exemplary apparatus for conversion of paper residue into a mineral product according to the present invention. Apparatus 1 includes fluidized bed device 2 with distribution plate 3 for securing an even distribution and supply of at least combustion air to the bed material and to the paper residue that is introduced into the fluidized bed device for conversion to the mineral product. Air box 4 is provided below distribution plate 3 for supplying combustion air symbolized by arrow 5 to air box 4 and eventually to the material and paper residue above distribution plate 3.

In accordance with this embodiment, apparatus 1 may further include heat exchanging section 6 which receives in separate parts ambient air symbolized by arrow 7 through the operation of fan 8. Heat exchanging section 6 receives flue gases escaping from fluidized bed device 2 through freeboard 10 and through connecting ducts 9 for exchanging heat between the flue gases and ambient air 7 for heating this ambient air which is to be used as combustion air 5. Heat exchanging section 6 is to this end connected to air box 4 for supplying heated ambient air 7 to air box 4.

Figure 2:
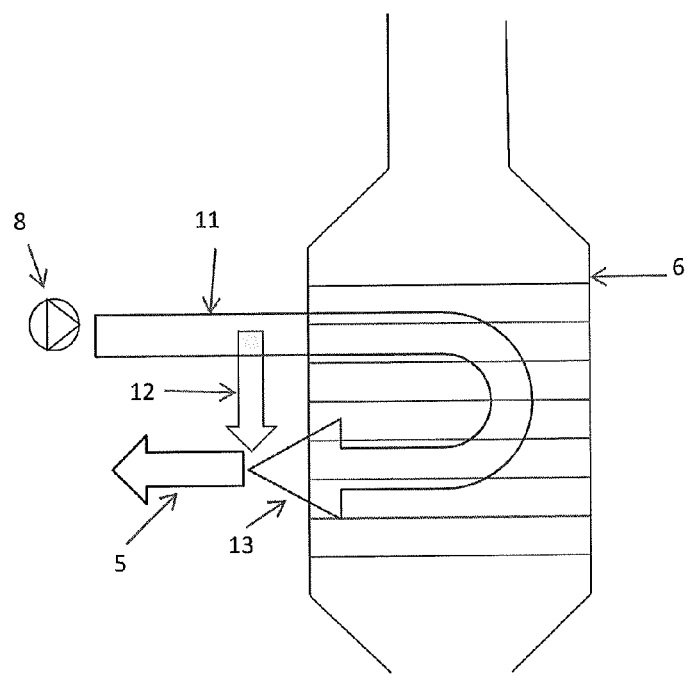
FIG. 2 is a schematic illustration of the heat exchanging section forming part of the apparatus shown in FIG. 1 according to the present invention.

Referring now to FIG. 2, there is shown heat exchanger 6 and further in this example not all ambient air 11 must be preheated in heat exchanger 6 in order to convert to combustion air 5 which may be introduced into air box 4. It is also possible that part 12 of ambient air 11 is bypassing heat exchanger 6 and is mixed with preheated air 13 that leaves heat exchanger 6 for providing the flow of combustion air 5 that may be introduced into air box 4.

According to the present invention, apparatus 1 is operated in a manner to control the amount of bed material above distribution plate 3 and the diameter of the bed material particles. For this purpose a control system is employed which is known per se and which therefore needs no elucidation. The inventive merit of the present invention is embodied in the manner this control system is used, notably to monitor and maintain a process parameter within a predefined range, whereby the process parameter is selected from the group including the amount of combustion air 5 and the temperature of combustion air 5 delivered to air box 4.

In the method for conversion of paper residue into a mineral product according to the present invention, wherein the amount of bed material above distribution plate 3 and the dimension of the particles of this bed material are controlled by maintaining the temperature of the combustion air introduced into the air box within a predefined range, for example a target value of the process parameter is defined in dependence of at least the calorific value of the paper residue and any other additional matter that is introduced into fluidized bed device 2. If any further matter is introduced into fluidized bed device 2 together with the paper residue, the calorific value of this further matter must be taken into account as well.

Further when the process parameter is the temperature of combustion air 5 introduced into air box 4, the range of the process parameter is selected at the target value of the temperature plus and minus 25° Celsius, for example plus and minus 15° Celsius.

Figure 5:
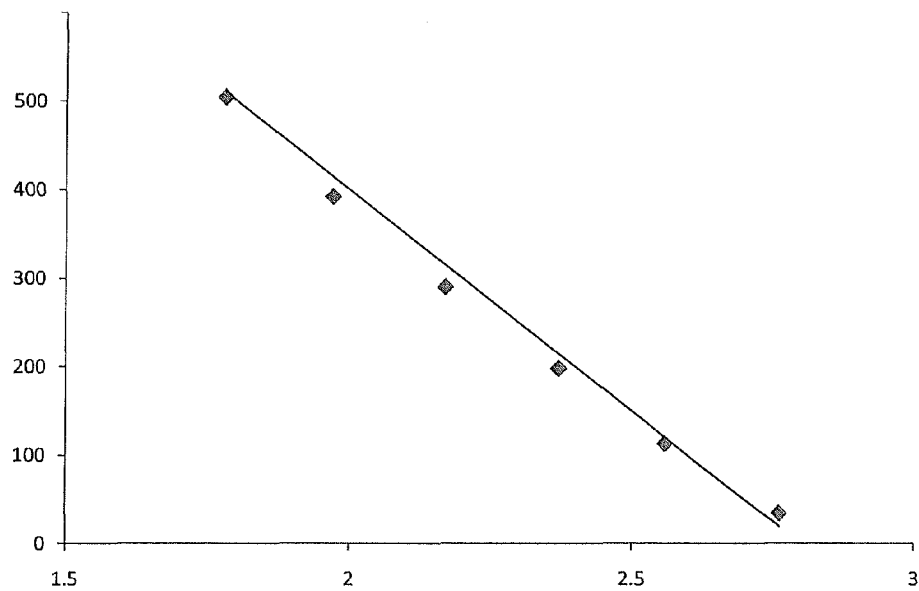
FIG. 5 shows a graph pertaining to the relation of the calorific value of the paper residue and other material that is introduced into the fluidized bed, and the desired target value of the temperature of the combustion air and other gases that are introduced into the air box according to the present invention.

Suitably, the target value of the temperature of the combustion air introduced into air box 4 is defined by the equation $'_{target}=-500*$calorific value$+1400$, wherein the calorific value relates to the paper residue and any other matter that is introduced into fluidized bed device 2. This is shown in FIG. 5 wherein the ordinate relates to the mentioned calorific value, and the abscissa relates to the target value of the temperature of the combustion air that is introduced into air box 4.

The process parameter may be the amount of combustion air 5 introduced into air box 4, in which case the range is selected at a target value of the amount plus and minus 15%.

Figure 3:
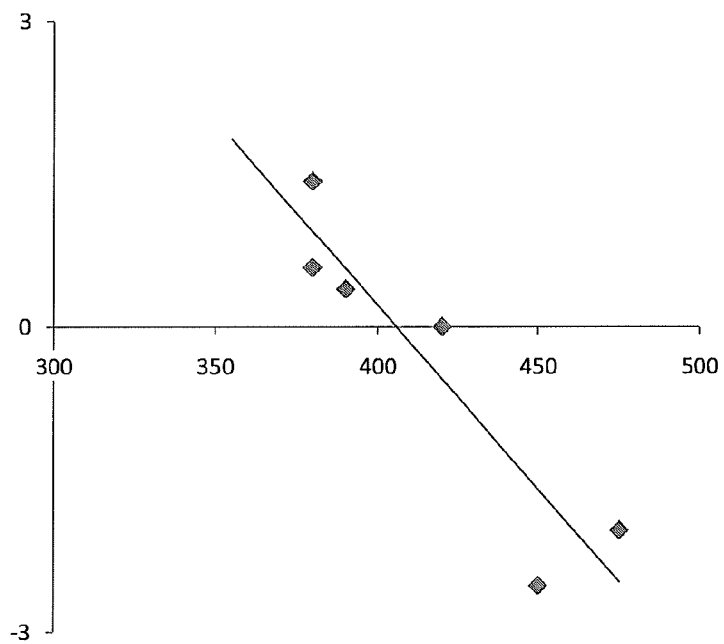
FIG. 3 shows a graph pertaining to the relation of the rate of change of the amount of bed material depending on the temperature of the combustion air in the air box of the apparatus shown in FIG. 1 according to the present invention.
Figure 4:
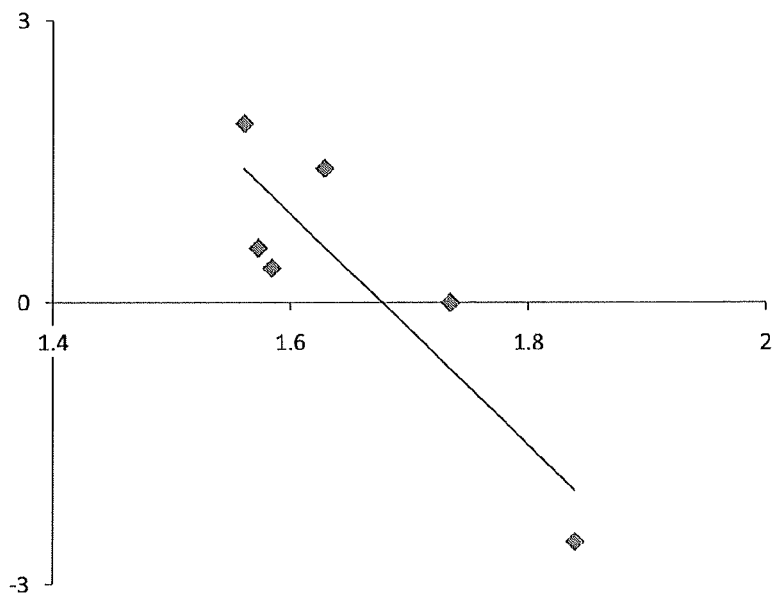
FIG. 4 shows a graph pertaining to the relation of the rate of change of the amount of bed material depending on the amount of combustion air and other gases that are introduced into the air box of the apparatus shown in FIG. 1 according to the present invention.

Results of the present invention are illustrated by FIGS. 3 and 4 respectively. FIG. 3 shows a graph illustrating the results when the temperature of combustion air 5 introduced into air box 4 is varied. In this figure the ordinate shows the temperature of combustion air 5 in centigrades, whereas the abscissa shows the rate of change of the amount of bed material per hour as measured by the variation of the bed pressure in millibar per hour. The amount of bed material proves to be virtually constant at around 410° C. at the prevailing calorific value of the paper residue that is introduced into fluidized bed device 2 which amounted in this example to approximately 2 MJ/kg.

FIG. 4 shows a graph illustrating the results when the amount of the combustion air 5 introduced into air box 4 is varied. In this figure the ordinate shows the amount of combustion air 5 in cubic meters per second normalized with respect to the square area of distribution plate 3, whereas the abscissa shows the rate of change of the amount of bed material per hour. The correlation between the amount of combustion air and the rate of change of the amount of bed material is marginally less than the correlation between the temperature of the combustion air and the rate of change, however there is a definite relation between the amount of combustion air 5 introduced into air box 4, and the rate of change of bed material above distribution plate 3. An optimum appears to be present when approximately near to 1.7 cubic meters per second per mz of distribution plate is introduced into air box 4. Further investigation has shown that this optimum relates to a situation in which approximately 40% organic material is present in the paper residue, which in most practical circumstances is the case.

Figure 6:
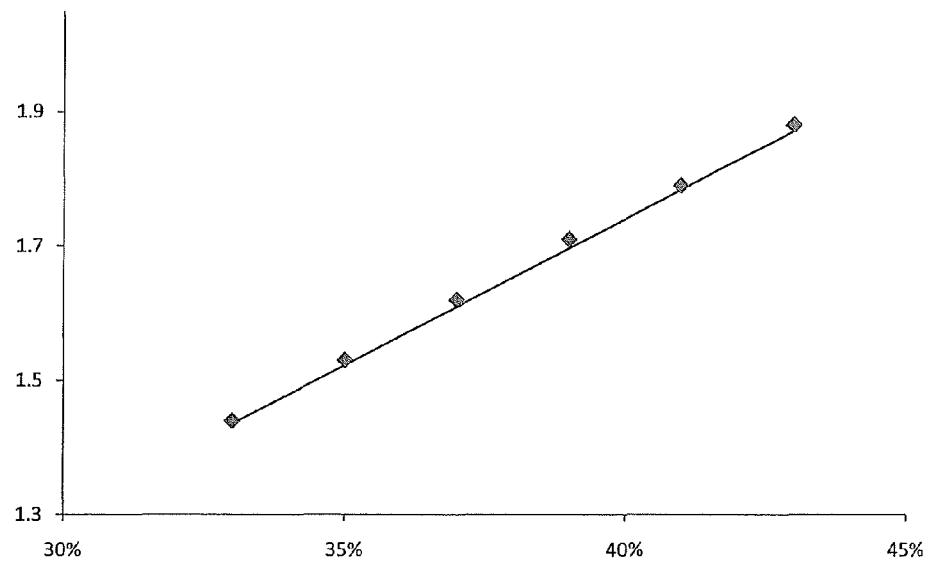
FIG. 6 shows a graph pertaining to the relation of the percentage of organic material in the paper residue, and the desired target value of the amount of combustion air and other gases that are introduced into the air box for each square meter of the distribution plate according to the present invention.

Referring now to FIG. 6, there is shown the relation between a variable amount of organic material present in the paper residue (this is shown at the ordinate), and the optimum amount of combustion air for each square meter of the distributional plate, which is shown at the abscissa. The relation between the two is defined by the equation $Q_{target}=4.35*$organic fraction, wherein the organic fraction relates to the percentage organic material forming part of the paper residue that is introduced into the fluidized bed device, and $Q_{target}$ relates to the target value of the amount of the combustion air that is supplied to the air box for each square meter of the distribution plate. When no information on the organic fraction is available, the value of 1.7 $m^3$ per second per mz of distribution plate may be taken as the target value of the amount of combustion air that is to be introduced into the air box.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for converting a paper residue into a mineral product, the apparatus comprising:
   a fluidized bed device, including:
   an air box;
   a distribution plate positioned above said air box and configured for an evenly distributed supply of at least a combustion air to a bed material positioned above said distribution plate and to a paper residue introduced into said fluidized bed device; and
   a control system configured for controlling an amount of said bed material above said distribution plate and a particle size of said bed material, said control system being arranged to monitor and maintain a process parameter within a predefined range, said process parameter being related to an amount of said combustion air, said control system being at least one of:
   1) arranged to control a temperature of said combustion air in said air box within a range of said process parameter selected at a predefined target value ($'_{target}$) of said temperature plus and minus 25° C., said predefined target value ($'_{target}$) of said temperature of said combustion air in said air box being expressed in centigrade is defined as follows:

$$'_{target}=-500*\text{calorific value}+1400$$

wherein said calorific value is expressed in Megajoules per kilogram (MJ/kg) and relates to said paper residue including any additional matter introduced into said fluidized bed device;

2) arranged to control said amount of combustion air supplied to said air box at a predefined target value target, ($Q_{target}$) plus and minus 15% for each square meter area of said distribution plate, wherein said target value ($Q_{target}$) of said combustion air supplied to said air box for each square meter of said distribution plate is defined as follows:

$$Q_{target} = 4.35 * \text{organic fraction}$$

wherein said organic fraction relates to a percentage of an organic material forming part of the paper residue introduced into said fluidized bed device; and 3) said control system is configured such that said target value of said amount of combustion air supplied to said air box for each square meter area of said distribution plate is set at a level of 1.7 cubic meters per second ($m^3/s$) for each square meter are of said distribution plate.

2. The apparatus according to claim 1, wherein said range of said process parameter is selected from said predefined target value of said temperature of said combustion air in said air box plus and minus 15° Celsius.

3. A method for conversion of a paper residue into a mineral product, the method comprising the steps of:

using a fluidized bed device to control a process parameter, said fluidized bed device, including:
an air box;
a distribution plate connected to said air box and positioned above said air box for an evenly distributed supply of at least a combustion air to a bed material positioned above said distribution plate and to a paper residue introduced into said fluidized bed device; and
controlling an amount of said bed material above said distribution plate and a particle size of said bed material above said distribution plate by maintaining said process parameter within a predefined range, said process parameter being related to an amount of said combustion air;

at least one of:

1) controlling a temperature of said combustion air in said air box within a range of said process parameter selected at a predefined target value ($'_{target}$) of said temperature plus and minus 25° C., said predefined target value ($'_{target}$) of said temperature of said combustion air in said air box being expressed in centigrade is defined as follows:

$$'_{target} = -500 * \text{calorific value} + 1400$$

wherein said calorific value is expressed in megajoules per kilogram (MJ/kg) and relates to said paper residue including any additional matter introduced into said fluidized bed device;

2) controlling said amount of combustion air supplied to said air box at a predefined target value ($Q_{target}$) plus and minus 15% for each square meter area of said distribution plate, wherein said target value ($Q_{target}$) of said combustion air supplied to said air box for each square meter of said distribution plate is defined as follows:

$$Q_{target} = 4.35 * \text{organic fraction}$$

wherein said organic fraction relates to a percentage of an organic material forming part of the paper residue introduced into said fluidized bed device; and 3) setting said target value of said amount of combustion air supplied to said air box for each square meter area of said distribution plate at a level of 1.7 cubic meters per second ($m^3/s$) for each square meter are of said distribution plate.

4. The method according to claim 3, wherein said range of said process parameter is selected from said predefined target value of said temperature of said combustion air in said air box plus and minus 15° Celsius.

* * * * *